United States Patent [19]

Valenti

[11] Patent Number: 5,033,193

[45] Date of Patent: Jul. 23, 1991

[54] BAGEL SCOOPER

[76] Inventor: Rose Valenti, 1371 Carale Ct., North Valley Stream, Long Island, N.Y. 11580

[21] Appl. No.: 547,801

[22] Filed: Jul. 2, 1990

[51] Int. Cl.$^5$ ............................................. B26D 3/06
[52] U.S. Cl. .................................... 30/124; 30/136.5; 30/300; 83/13; 83/875; 99/567
[58] Field of Search ...................... 30/124, 136, 136.5, 30/300, 310; 7/113; 83/875, 935, 13; 426/503; 99/538, 547, 548, 567; 408/204, 205, 72 R

[56] References Cited

U.S. PATENT DOCUMENTS

| | | | |
|---|---|---|---|
| 2,680,706 | 9/1952 | Wakefield | 30/136 X |
| 3,786,564 | 4/1974 | Acheson | 30/124 |
| 4,548,118 | 10/1985 | Brosch | 30/310 |
| 4,979,419 | 12/1990 | Sonkin | 30/300 X |

Primary Examiner—Douglas D. Watts
Attorney, Agent, or Firm—Jordan B. Bierman

[57] ABSTRACT

A scooper for a circular piece of bread-like material including a holder having a substantially circular base, a wall extending vertically upwardly from the perimeter of said base, and a gripper mounted on said base; the holder is adapted to receive the material, thereby preventing it from rotating. A rotor having a substantially circular bottom with a periphery fitting within the base and adapted for rotation with respect thereto. A cutter having a blade is located on the bottom and extends therebelow, so that said blade is at the leading edge of said cutter as the rotor turns. The blade is arcuate, whereby rotation of said rotor causes the blade to cut into the piece and remove a portion thereof.

13 Claims, 2 Drawing Sheets

BAGEL SCOOPER

The present invention is directed to a device for removing excess material from bread or bread-like products, especially a device for scooping out the interior of a bagel.

BACKGROUND OF THE INVENTION

As is well recognized, overweight is one of the major health problems existing today in this country. Innumerable people are on diets of various kinds, all seeking to reduce their intake of fattening foods.

Furthermore, there are those, on the other end of the scale, whose appetites are relatively small, and who would prefer to keep their portions small. This can readily be done so far as foods which are prepared in the home are concerned, but outside products can present some problems.

In particular, such "bread" items as bagels are prepared professionally and are of a certain size. This size is often much greater than is desirable for the dieter or for the person with the small appetite. This is true even if the bagel is cut in half through its plane.

Prior art devices attempting to solve this problem are known. In particular, there are wooden holders having a plurality of slots into which the whole bagel is placed. The user then sliced through the bagel guiding the knife in the slots. This permits cutting into four thin slices. However, the outer crust is often considered to be the best part. Therefore, the two inner slices (having virtually no crust at all), are less desirable to the eater.

BRIEF DESCRIPTION OF THE PRESENT INVENTION

It is, therefore, an object of the present invention to provide a means for preparing a bagel so that the bulk of the inner portion is removed, but the crust remains. It is a further object of the present invention to provide such a device which is simple to operate, easy to clean, and inexpensive to manufacture.

DETAILED DESCRIPTION OF THE PRESENT INVENTION

The device of the present invention comprises a holder and a rotor fitting therein. The holder is generally cylindrical in shape and has a gripper mounted in the bottom thereof.

The rotor fits within the walls of the holder and is adapted for rotation with respect thereto. A cutter is mounted on the rotor and the blade thereof extends below its bottom surface. An incline is provided from the blade to the level of the upper surface of the rotor so that the portions of the bagel which have been removed can easily be separated from the remainder.

In operation, the bagel is sliced in half through its plane and, with the cut side up, the bagel is placed in the holder. The rotor is then inserted and used to press the bagel onto the gripper. The holder is held stationary and the handle on the rotor is turned. This causes the rotor itself to turn relative to the holder.

Since the grippers prevent the bagel from rotating, the angle of the cutter causes it to dig into the bagel and to scoop out a substantial portion, leaving only a circular half-toroidal shell.

The inclination provided just behind the cutting blade causes the cut out portion to move up through the opening in the rotor onto the top surface thereof. This neatly separates the undesired portion of the bagel from its shell. The resultant product may be eaten as is, or the hollow portion filled with any desirable food.

BRIEF DESCRIPTION OF THE DRAWINGS

In the accompanying drawings, constituting a part hereof and in which like reference characters indicate like parts.

Figure 1:
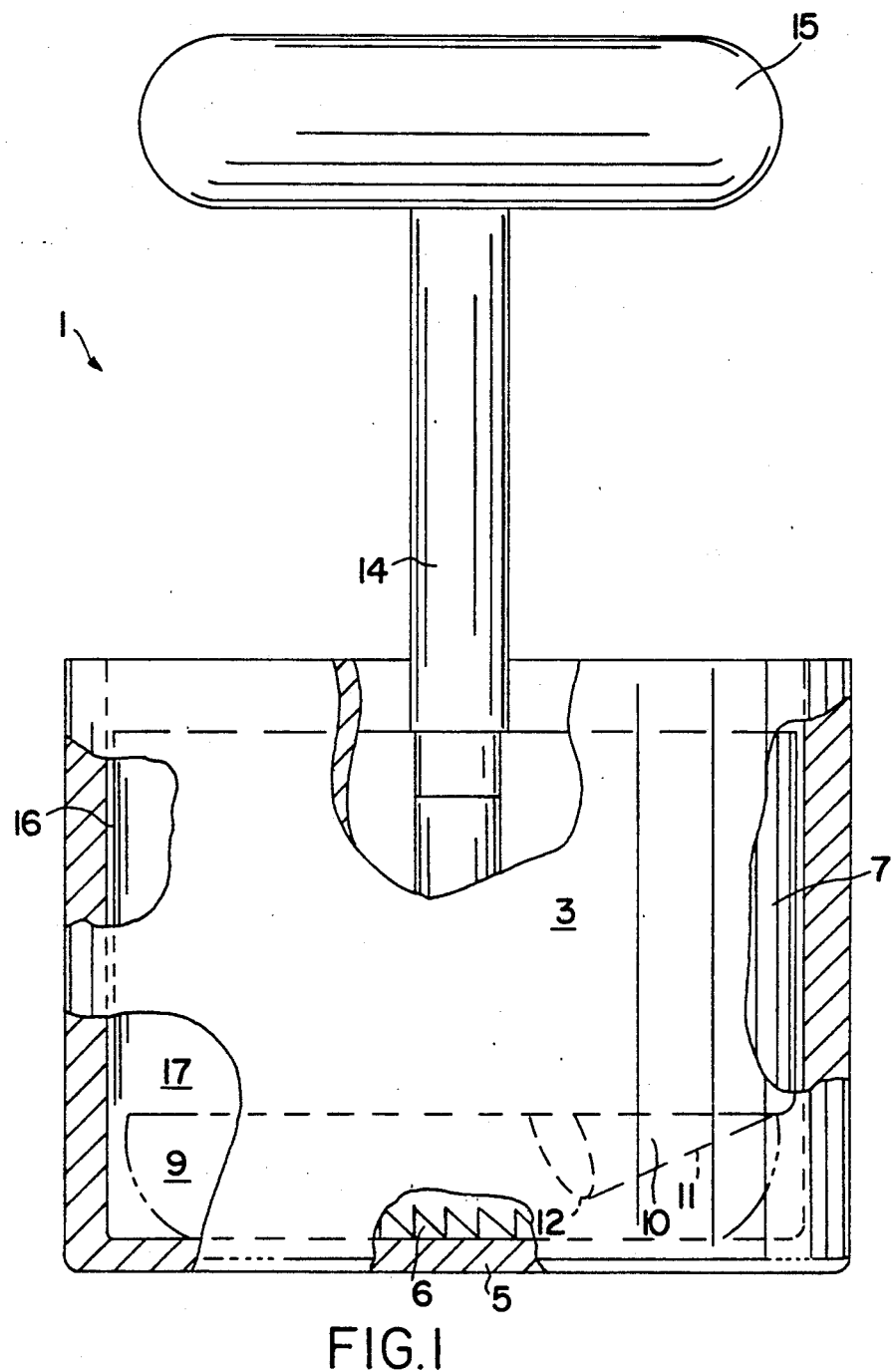
FIG. 1 is an elevation of the device of the present invention, partly in section and partly broken away.
Figure 2:
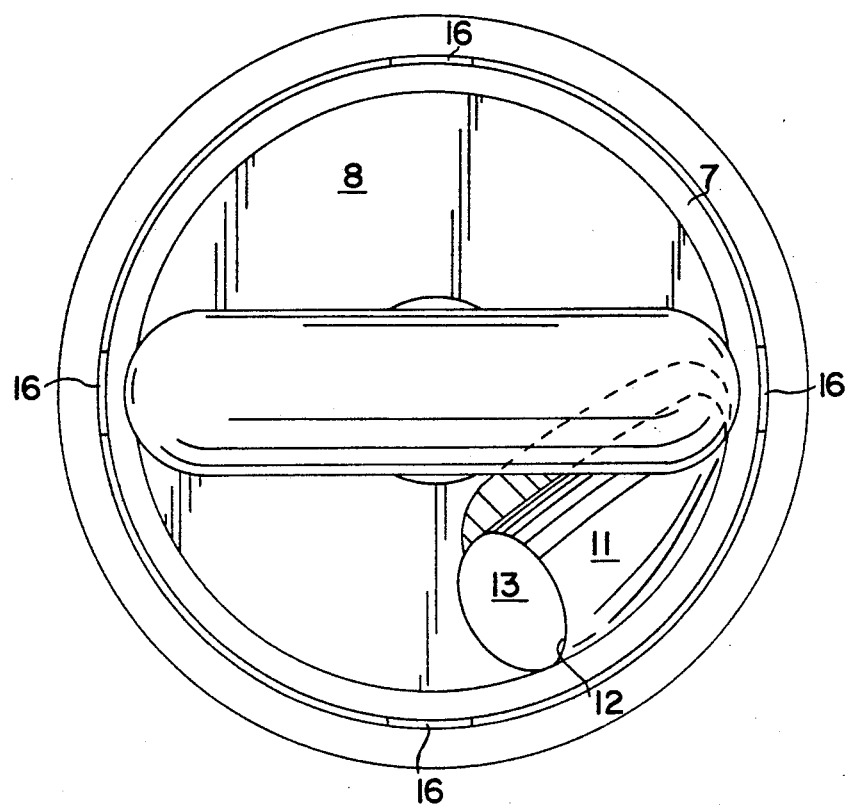
FIG. 2 is a plan view of the present invention.
Figure 3:
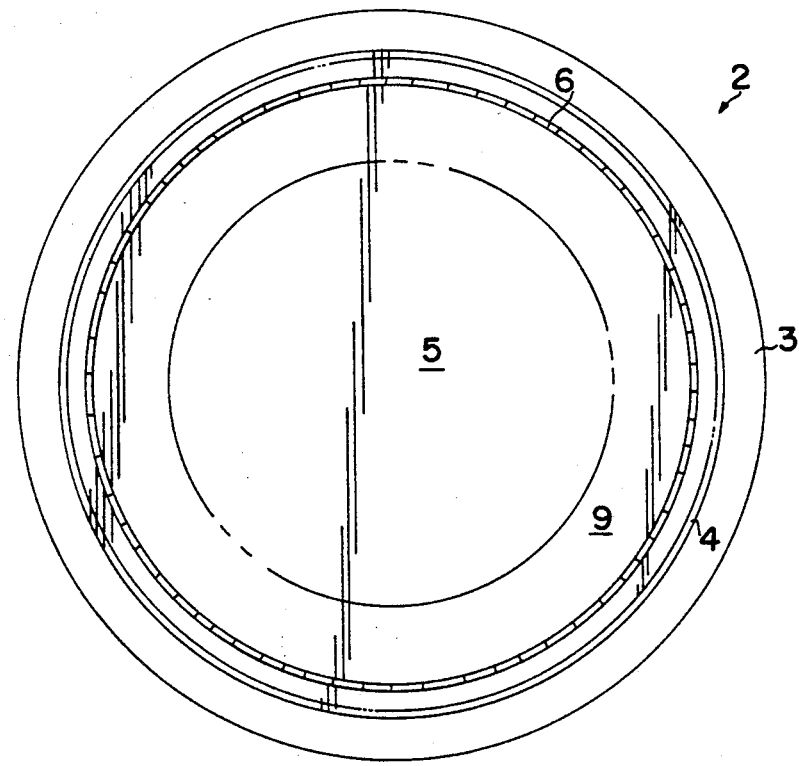
FIG. 3 is a view similar to that of FIG. 2, but with the rotor removed.

Referring now to the Figures, scooper 1 comprises holder 2 having wall 3 upstanding from the perimeter of base 5. Gripper 6 is mounted on base 5 and comprises a series of saw teeth which are adapted to puncture the bottom of bagel 9 and thereby secure it in position. Rotor 7 comprises bottom 8 having opening 13 therethrough. Blade 12 is at the leading edge of incline 11. Rod 14 is secured to the center of bottom 8 and its other end terminates in handle 15.

In order to minimize friction, pads 16 are provided in surface 17. At the same time, rotor 7 is made slightly smaller than the internal diameter of holder 2 so that only pads 16 contact inner wall 4. In this manner, rotor 7 is securely positioned within holder 2, but can be rotated therein with minimum friction.

In using scooper 1, bagel 9 is first cut in half. It is then placed with its cut side up within holder 2.

It can be pressed onto gripper 5 directly or by means of rotor 7. This causes the teeth of cutter 6 to penetrate the underside of bagel 9 and hold it securely in position so that it cannot rotate.

Handle 15 is turned so that blade 12 cuts into bagel 9 and the cut portion travels up incline 10 onto the upper surface of rotor 7. When a complete revolution has been made, the entire cut out portion rests on top of rotor 7, and the scooped-out bagel remains on base 5.

A modification of the Invention provides a second cutter, concentric with the first cutter, of much smaller diameter. This will assist in gripping the bagel and will also permit use of the device in connection with bread-like products of diameter substantially smaller than that of the holder.

While only a limited number of specific embodiments of the present invention has been expressly disclosed, it may, nonetheless, be modified as would be apparent to the person of ordinary skill in the art. Therefore, the present invention is to be broadly construed and not to be limited except by the character of the claims appended hereto.

I claim:

1. A scooper for a circular piece of bread-like material comprising
    a holder having a substantially circular base, a wall extending vertically upwardly from the perimeter of said base, and a gripper mounted on said base, said gripper adapted to receive and retain said piece, thereby preventing it from rotating,
    a rotor having a substantially circular bottom with a periphery, said rotor fitting within said base and adapted for rotation in a direction with respect thereto,
    a cutter on said bottom having a blade on said bottom and extending therebelow, and located so that said blade is at the leading edge of said cutter when said rotor turns in said direction, said blade being arcuate, whereby rotation of said rotor in said direction causes said blade to cut into said piece and remove a portion thereof.

2. The scooper of claim 1 wherein said gripper comprises a plurality of upstanding teeth upon which said piece is impaled.

3. The scooper of claim 2 wherein said gripper is a saw-tooth ring adjacent said wall.

4. The scooper of claim 1 wherein said blade is mounted on an incline which slopes upwardly away from said leading edge.

5. The scooper of claim 1 wherein there is an opening in said rotor immediately forward of said leading edge.

6. The scooper of claim 1 wherein said rotor has a surface extending vertically upwardly from said periphery and fitting within said wall.

7. The scooper of claim 6 wherein said surface is provided with at least one pad projecting radially outwardly from said surface and in contact with said wall, whereby friction between said wall and said surface is reduced.

8. The scooper of claim 7 wherein there is a plurality of said pads, spaced apart circumferentially on said surface.

9. The scooper of claim 1 further comprising a handle on said rotor adapted to turn said rotor in said direction.

10. The scooper of claim 9 wherein said handle is attached to said rotor by a rod fixed substantially at the center of said rotor.

11. The scooper of claim 1 wherein said piece is a bagel.

12. A method of scooping a circular piece of breadlike material comprising pressing said piece into the holder of claim 1, impaling it on said gripper, inserting said rotor into said holder and pressing it against the upper surface of said piece, rotating said rotor in said direction, whereby said blade cuts into said piece, excises a portion thereof, and separates said portion from the remainder of said piece.

13. The method of claim 12 wherein said rotation causes an incline to which said blade is attached to move between said portion and said remainder, whereby said remainder is on said rotor when said rotor has completed one revolution.

* * * * *